United States Patent [19]

Sheehan

[11] Patent Number: 5,356,191
[45] Date of Patent: Oct. 18, 1994

[54] PROTECTIVE COVER FOR THE WINDSHIELD OF AN AUTOMOBILE

[75] Inventor: Dan Sheehan, Cambridge, Canada

[73] Assignee: Auto-Shade, Inc., Moorpark, Calif.

[21] Appl. No.: 98,477

[22] Filed: Jul. 26, 1993

[51] Int. Cl.⁵ ............................................. B60J 3/00
[52] U.S. Cl. ........................ 296/95.1; 160/370.2 R; 150/168; 296/136
[58] Field of Search ............... 296/95.1, 136, 97.7; 160/370.2 R; 150/166, 168, DIG. 2

[56] References Cited

U.S. PATENT DOCUMENTS

| 3,184,264 | 5/1965 | Ealey et al. | 296/95.1 |
|---|---|---|---|
| 4,109,957 | 8/1978 | Polizzi et al. | 296/95.1 |
| 4,799,728 | 1/1989 | Akers et al. | 296/95.1 X |
| 4,848,825 | 7/1989 | Niemberger | 296/95.1 |
| 5,035,460 | 7/1991 | Huang | 296/95.1 |
| 5,037,156 | 8/1991 | Lundberg | 296/95.1 |
| 5,121,957 | 6/1992 | O'Shea | 296/95 H |

FOREIGN PATENT DOCUMENTS 1196566 11/1959 France ...................... 296/95.1

Primary Examiner—Joseph D. Pape
Attorney, Agent, or Firm—Blakely, Sokoloff, Taylor & Zafman

[57] ABSTRACT

A protective cover for the windshield of an automobile. The cover has a pair of flaps that extend from a center cover section. The center cover section has an area that can cover most conventional windshields. The center section is placed over the windshield and the flaps are wrapped around to the side windows of the car. The flaps each have suction cups that secure the cover to the vehicle. The flaps and center section can be folded into a pouch that is secured in the folded position by a zipper that is attached to the center section and a pouch member which extends from the center portion of the sheet.

4 Claims, 3 Drawing Sheets

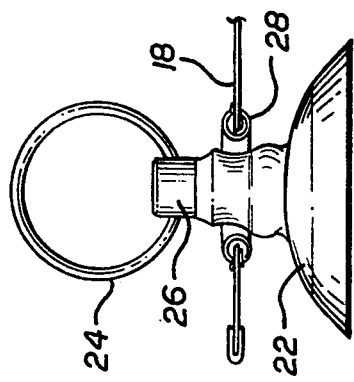
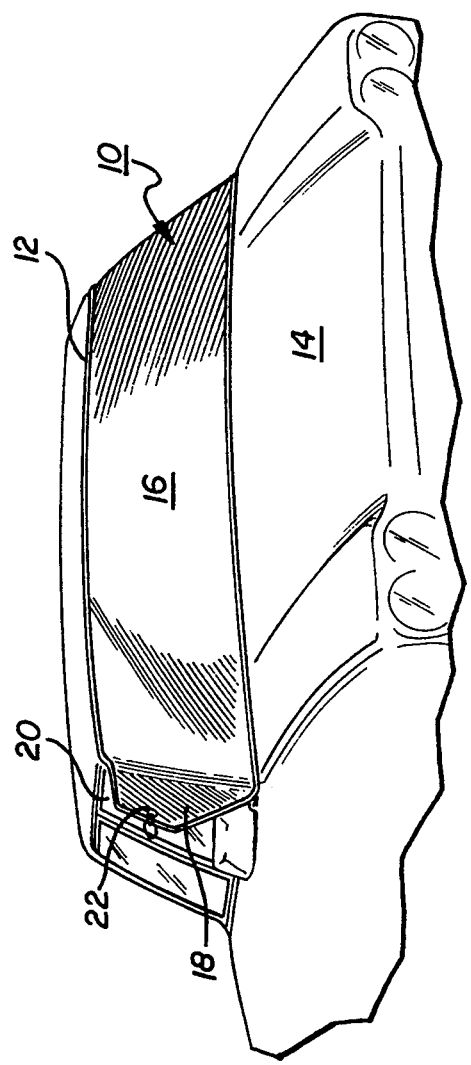
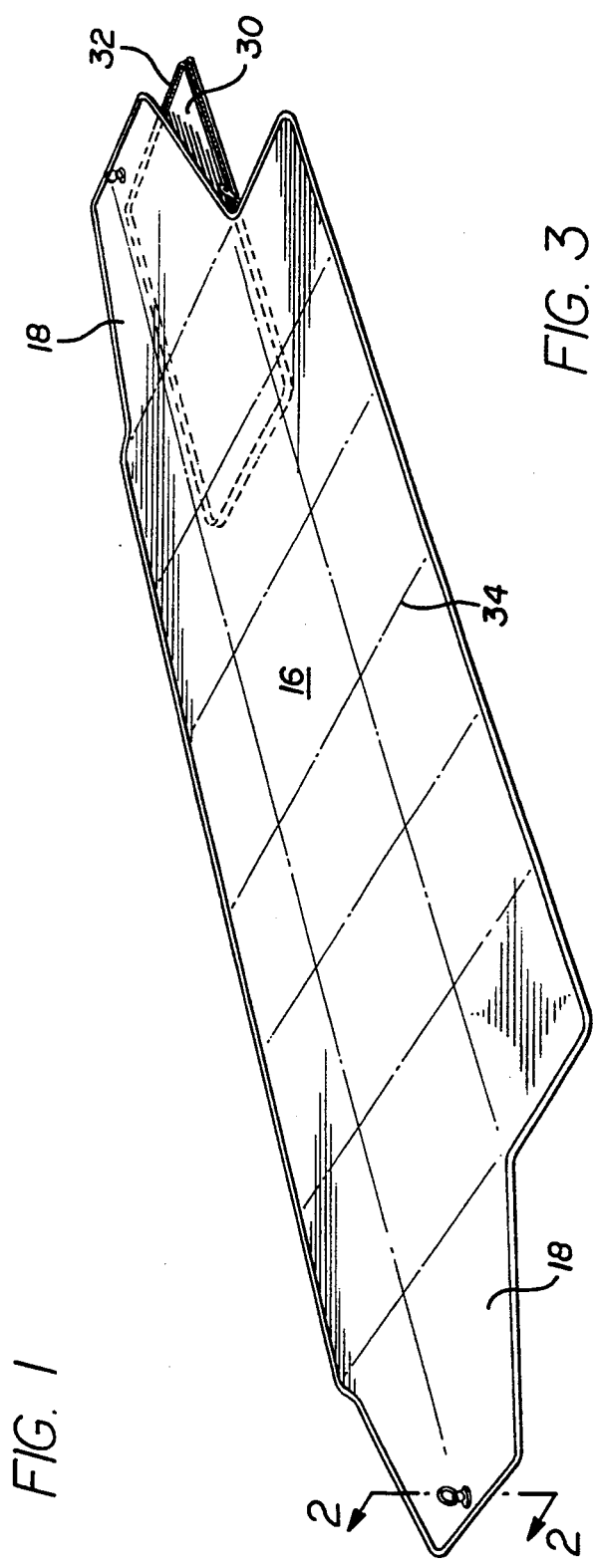

PROTECTIVE COVER FOR THE WINDSHIELD OF AN AUTOMOBILE

BACKGROUND OF THE INVENTION

1. Field of the Invention

The present invention relates to a protective cover for the windshield of an automobile.

2. Description of Related Art

Automobiles that are used in northern climates are subject to harsh environmental conditions such as ice and snow. Cars that are parked out in winter weather can accumulate layers of ice or snow on the body of the vehicle. Before operating the vehicle, the driver must remove the ice/snow from the windows of the car, particularly the windshield. This procedure is typically performed with a ice scrapper and is done out in relatively cold temperatures. It would be desirable to have a protective cover that would prevent the accumulation of ice or snow on the windshield of a car. It would also be desirable if such a cover was easy to use and store.

SUMMARY OF THE INVENTION

The present invention is a protective cover for the windshield of an automobile. The cover has a pair of flaps that extend from a center cover section. The center cover section has an area that can cover most conventional windshields. The center section is placed over the windshield and the flaps are wrapped around to the inside of the side windows of the car. The flaps each have suction cups that secure the cover to the vehicle. The flaps and center section can be folded into a pouch that is secured in the folded position by a zipper that is attached to the center section and a pouch member which extends from the center portion of the sheet.

In operation, the unfolded sheet is secured to the windshield by attaching the suction cups to the side windows of the vehicle. Any ice or snow that would normally form or fall on the windshield is accumulated by the cover. The driver can remove the snow/ice from the windshield by merely removing the cover from the car. The protective cover is typically constructed from a relatively smooth synthetic material, so that the snow/ice can be readily removed from the cover. When not in use, the cover can be folded and stored in the trunk of the automobile.

It is therefore an object of the present invention to provide a protective cover for the windshield of an automobile.

It is also an object of the present invention to provide a protective cover for the windshield of an automobile that is easy to use and store.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a cover of the present invention attached to an automobile;

FIG. 2 is an enlarged view of a suction cup assembly of the cover;

FIG. 3 is a perspective view of the cover in an unfolded position;

DETAILED DESCRIPTION OF THE INVENTION

Figure 4:
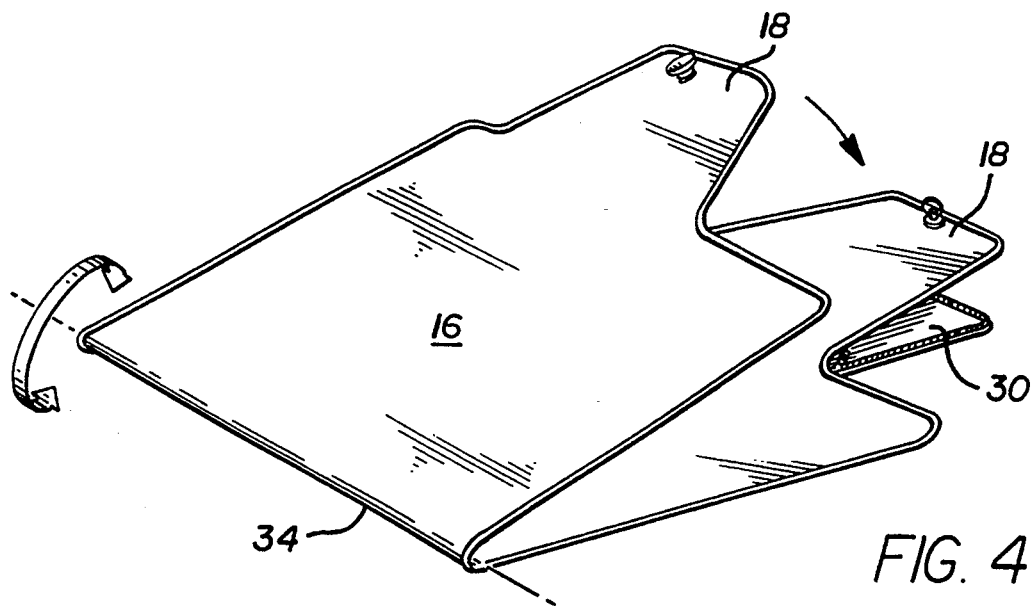
FIG. 4 is a perspective view showing the cover being folded about a center fold line.

Referring to the drawings more particularly by reference numbers, FIG. 1 shows a cover 10 attached to the windshield 12 of an automobile 14. The cover 10 has a center section 16 that covers the windshield 12 and a pair of flaps 18 that wrap around to the side windows 20 of the vehicle 14. In the preferred embodiment, the flaps 18 are wrapped completely around the side windows 20, so that the suction cups 22 are attached to the inside of the windows 20. The flaps 18 each have a suction cup 22 that can be pressed to the side windows 20 to secure the cover to the car 14. As shown in FIG. 2, attached to the cups 22 are a pair of rings 24 which allow the user to easily remove the flaps 18 from the windows 20. Each ring 24 is attached to a cup stem 26 that extends through the opening of a grommet 28 sewn into the flap 18. The cover 10 is preferably constructed from a nylon material which is rugged and easy to clean. In the preferred embodiment, the center section is approximately 63 inches long and 28.5 inches wide. Such an area has been found to adequately cover the windshields of most automobiles.

Figure 5:
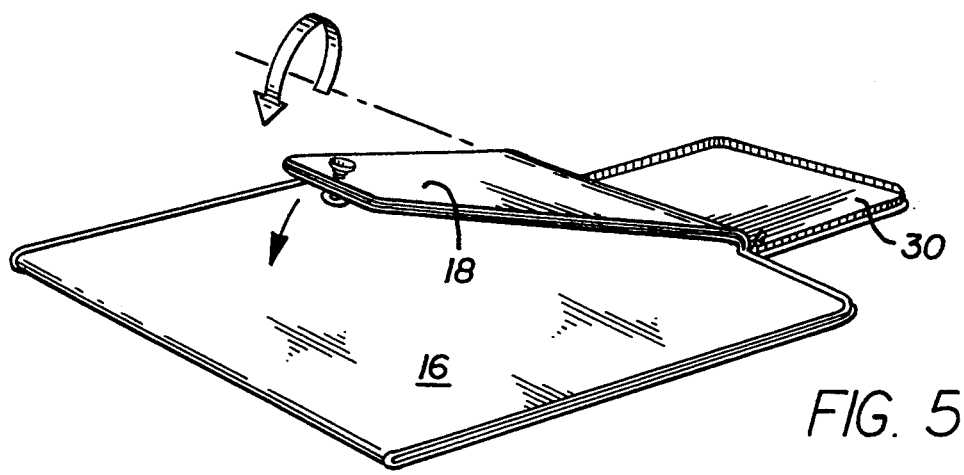
FIG. 5 is a perspective view showing flaps being folded onto the center section of the cover.
Figure 6:
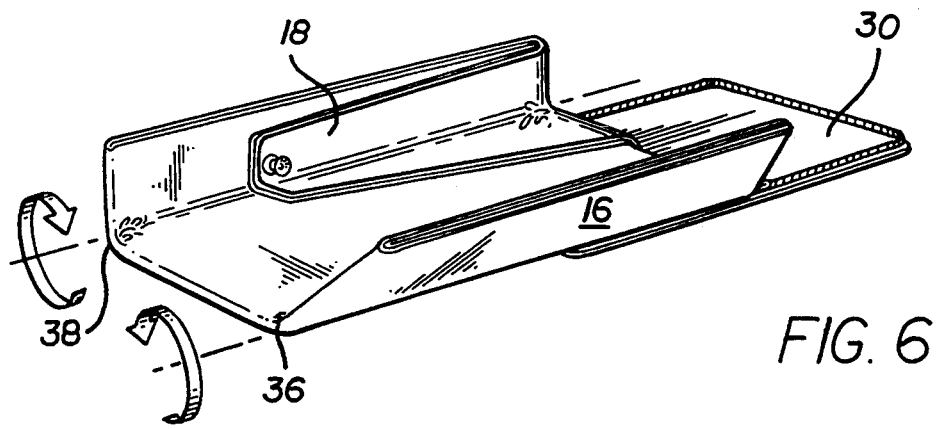
FIG. 6 is a perspective view showing the center section being folded about a pair of longitudinal fold lines.
Figure 7:
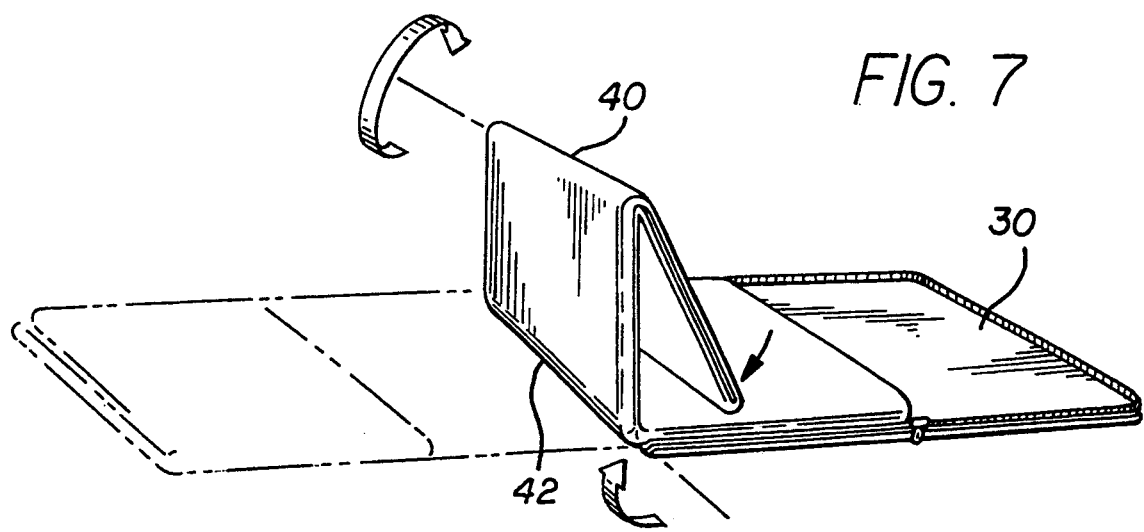
FIG. 7 is a perspective view showing the center section being folded about a pair of folded fold lines to create a folded sheet.
Figure 8:
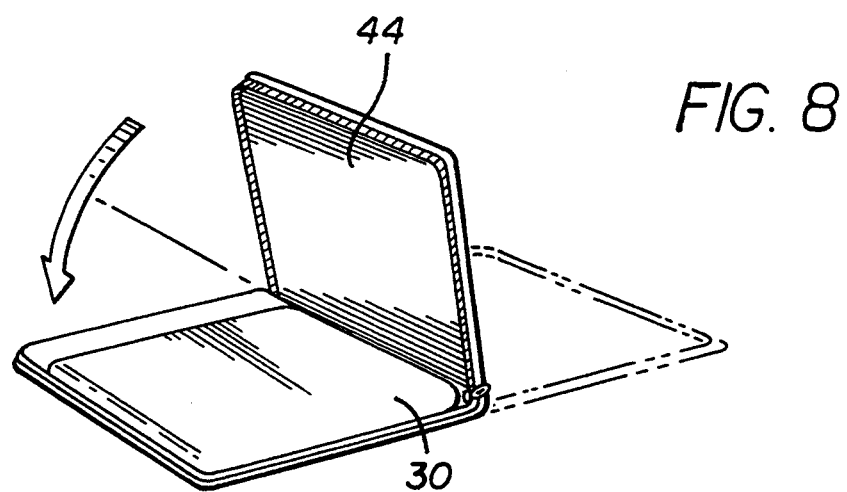
FIG. 8 is a perspective view showing the folded center sheet being folded onto a pouch member.
Figure 9:
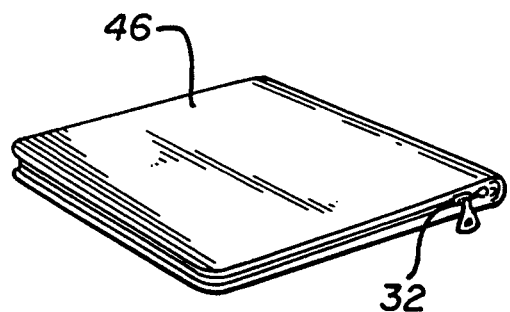
FIG. 9 is a perspective view showing a folded cover.

As shown in FIGS. 3-9, the flaps 18 and center section 16 can be folded into a folded sheet that is attached to a pouch member 30 to form a compact folded cover. The pouch member 30 extends from the center section 16 and has a zipper 32 that can secure the folded sheet in the folded cover position. As shown in FIG. 4., the center section 16 is initially folded about a center fold line 34 so that the flaps 18 are adjacent to each other. As shown in FIG. 5, the flaps 18 are then folded onto the center section 16. The center section is then folded about a first longitudinal fold line 36 and then a second longitudinal fold line 38 as shown in FIG. 6. As shown in FIG. 7, the folded center section is further folded about a first folded fold line 40 and then a second folded fold line 42 to create a folded sheet 44. As shown in FIG. 8, the folded sheet 44 is folded onto the pouch 30 to align the zippers 32. The zipper 32 is then zipped to create the folded cover 46 shown in FIG. 9. The folded cover 46 provides a easy means to carry and stored the protective cover 10.

In use, the cover 10 is unzipped, unfolded and attached to the windshield of an automobile. Any snow or ice that normally forms or falls on the windshield will be accumulated by the cover 10. Before operating the vehicle, the user removes the cover 10 and shakes the ice or snow off of the nylon surface. The cover 10 is then folded and stored. The protective cover 10 thus provides a means for maintaining the visibility of a windshield even when the vehicle is parked in winter conditions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A cover for a windshield of an automobile, comprising:
    a flexible sheet that has a cover section, a pair of flaps that extend from said cover section and a pouch member that extends from said center section which has an outer cover section, said flaps and center section being capable of being folded into a folded sheet that can be placed in said outer cover section;
    a zipper attached to said pouch member and said outer cover section, said zipper fastens together said pouch member to said outer cover section to enclose said folded sheet; and,
    windshield coupling means for coupling said unfolded cover section to the windshield.

2. The cover as recited in claim 1, wherein said windshield coupling means includes a pair of suction cups attached to said flaps.

3. The cover as recited in claim 2, further comprising a pair of rings coupled to said suction cups.

4. A method for folding and securing a cover for a windshield of an automobile, comprising the steps of:
    a) providing a flexible sheet that has a cover section, a pair of flaps that extend from said cover suction and a pouch member that extends from said center section which has an outer cover section, said flexible sheet further having windshield coupling means for coupling said flexible sheet to the windshield and a zipper attached to said pouch member and said outer cover section;
    b) folding said center section about a center fold line;
    c) folding said flaps onto said center section;
    d) folding said center section about a first longitudinal fold line;
    e) folding said center section about a second longitudinal fold line;
    f) folding said center section about a first folded fold line;
    g) folding said center section about a second folded fold line so that said folded center section is within said outer cover section;
    h) folding said pouch member onto said outer cover section; and,
    i) fastening said pouch member to said outer cover section.

* * * * *

UNITED STATES PATENT AND TRADEMARK OFFICE
CERTIFICATE OF CORRECTION

PATENT NO. : 5,356,191

DATED : 10/18/94

INVENTOR(S) : Sheehan

It is certified that error appears in the above-identified patent and that said Letters Patent is hereby corrected as shown below:

Col. 02, line 30   delete "grommet"   insert --grommet--

Signed and Sealed this

Seventh Day of February, 1995

BRUCE LEHMAN

*Attest:*

*Attesting Officer*        *Commissioner of Patents and Trademarks*